US009319986B2

(12) United States Patent
Hasegawa (10) Patent No.: US 9,319,986 B2
(45) Date of Patent: Apr. 19, 2016

(54) METHOD OF CONTROLLING MOBILE INFORMATION TERMINAL AND MOBILE INFORMATION TERMINAL (71) Applicant: FUJITSU LIMITED, Kawasaki-shi, Kanagawa (JP)

(72) Inventor: Eiji Hasegawa, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 94 days.

(21) Appl. No.: 14/187,401

(22) Filed: Feb. 24, 2014

(65) Prior Publication Data
US 2014/0287793 A1 Sep. 25, 2014

(30) Foreign Application Priority Data

Mar. 21, 2013 (JP) ................................. 2013-059079

(51) Int. Cl.
H04W 52/02 (2009.01)
(52) U.S. Cl.
CPC ............ *H04W 52/0254* (2013.01); *Y02B 60/50* (2013.01)
(58) Field of Classification Search
CPC ............ H04W 52/02; H04W 52/0209; H04W 52/0225–52/0258; H04W 52/0261; H04W 52/0274–52/028; G01S 19/01–19/55
See application file for complete search history.

(56) References Cited

U.S. PATENT DOCUMENTS

| 6,501,420 B2* | 12/2002 | Townsend ............. G01S 5/0018 342/357.55 |
| 7,177,601 B1* | 2/2007 | Kurk et al. ...................... 455/73 |
| 8,116,725 B2* | 2/2012 | Jeong ......................... 455/404.2 |
| 2002/0127967 A1* | 9/2002 | Najafi ........................... 455/3.05 |
| 2009/0098880 A1* | 4/2009 | Lindquist ................... 455/456.1 |
| 2009/0278738 A1* | 11/2009 | Gopinath ................. G01S 19/47 342/357.74 |
| 2013/0005357 A1* | 1/2013 | Takahashi et al. ......... 455/456.1 |
| 2013/0210408 A1* | 8/2013 | Hohteri ................. G06F 1/3231 455/418 |
| 2015/0087332 A1* | 3/2015 | Pijl ......................... G01S 19/34 455/456.1 |

FOREIGN PATENT DOCUMENTS

| JP | 2006-153695 A | 6/2006 |
| JP | 2009-031115 A | 2/2009 |
| JP | 2011-022115 A | 2/2011 |
| JP | 2011-228788 A | 11/2011 |

OTHER PUBLICATIONS

D. Chowdhary, R. Biggs, Use of Radio Signal strength for activating a GPS receiver, Mar. 9, 2009, Motorola, located at https://priorart.ip.com/IPCOM/000180413.*

* cited by examiner

*Primary Examiner* — Gennadiy Tsvey
(74) *Attorney, Agent, or Firm* — Oblon, McClelland, Maier & Neustadt, L.L.P.

(57) ABSTRACT

A method of controlling a mobile information terminal that includes a device for identifying a position of the mobile information terminal based on a received signal includes activating, by a processor, the device based on a reception status of the received signal before deactivating the device, and an index related to movement of the mobile information terminal after deactivating the device.

15 Claims, 6 Drawing Sheets

| THE NUMBER OF GPS SATELLITES OF 10 dBm OR GREATER | THRESHOLD FOR THE NUMBER OF STEPS | BASE STATION CHANGE DETERMINATION RULE | SIGNAL INTENSITY THRESHOLD |
|---|---|---|---|
| 4 OR GREATER | – | – | – |
| 2~3 | 2 | MOVEMENT DETECTED | VARIANCE>10 |
| 0~1 | 10 | CHANGE IS DETECTED TWICE OR MORE WITHIN 2 MINUTES | VARIANCE>20 |

FIG. 6

METHOD OF CONTROLLING MOBILE INFORMATION TERMINAL AND MOBILE INFORMATION TERMINAL

CROSS-REFERENCE TO RELATED APPLICATION

This application is based upon and claims the benefit of priority of the prior Japanese Patent Application No. 2013-059079, filed on Mar. 21, 2013, the entire contents of which are incorporated herein by reference.

FIELD

The embodiments discussed herein are related to methods of controlling a mobile information terminal and a mobile information terminal.

BACKGROUND

In recent years, so-called "location-based services" have become available. The location-based services offer services based on the location of mobile information terminals. In the location-based services, a mobile information terminal acquires location information periodically or in response to a positioning request from an application as a trigger, using GPS satellite signals.

However, for example, in the case where the reception of GPS satellite signals is poor, such as when the mobile information terminal is inside a building, even if GPS positioning is carried out, the mobile information terminal may fail to acquire location information, resulting in waste of power.

As a method for reducing power consumption, Japanese Laid-open Patent Publication No. 2011-22115 discloses a technique for controlling a mobile information terminal so as to stop GPS positioning when a walk of a predetermined distance or greater is not detected, and to restart GPS positioning when a walk of a predetermined distance or greater is detected.

SUMMARY

According to an aspect of the invention, a method of controlling a mobile information terminal that includes a device for identifying a position of the mobile information terminal based on a received signal includes activating, by a processor, the device based on a reception status of the received signal before deactivating the device, and an index related to movement of the mobile information terminal after deactivating the device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

In the case of the related-art technique, GPS positioning is restarted in response to detection of a walk of a predetermined distance or greater as a trigger. That is, as recognized by the present inventor, even if the reception of GPS satellite signals is not improved, GPS positioning might be restarted, resulting in waste of power.

Hereinafter, an embodiment will be described with reference to FIGS. 1 through 6.

The reception of GPS satellite signals varies depending on, for instance, the presence of surrounding buildings, the location inside a building (for example, the distance from a window), and the like. For example, when a mobile information terminal is near the window, the reception of GPS satellite signals is improved by simply moving the mobile information terminal slightly. However, when the mobile information terminal is away from the window, the reception might not be improved by simply moving the mobile information terminal slightly.

In view of the above, in the following embodiments, the timing of restarting GPS positioning, that is, the timing of restarting a GPS module in a mobile terminal is changed on the basis of the reception status of GPS satellite signals. Thus, if the reception of GPS satellite signals is not improved, GPS positioning is not restarted. Accordingly, wasteful power consumption is reduced. A more detailed description will be given below.

Figure 1:
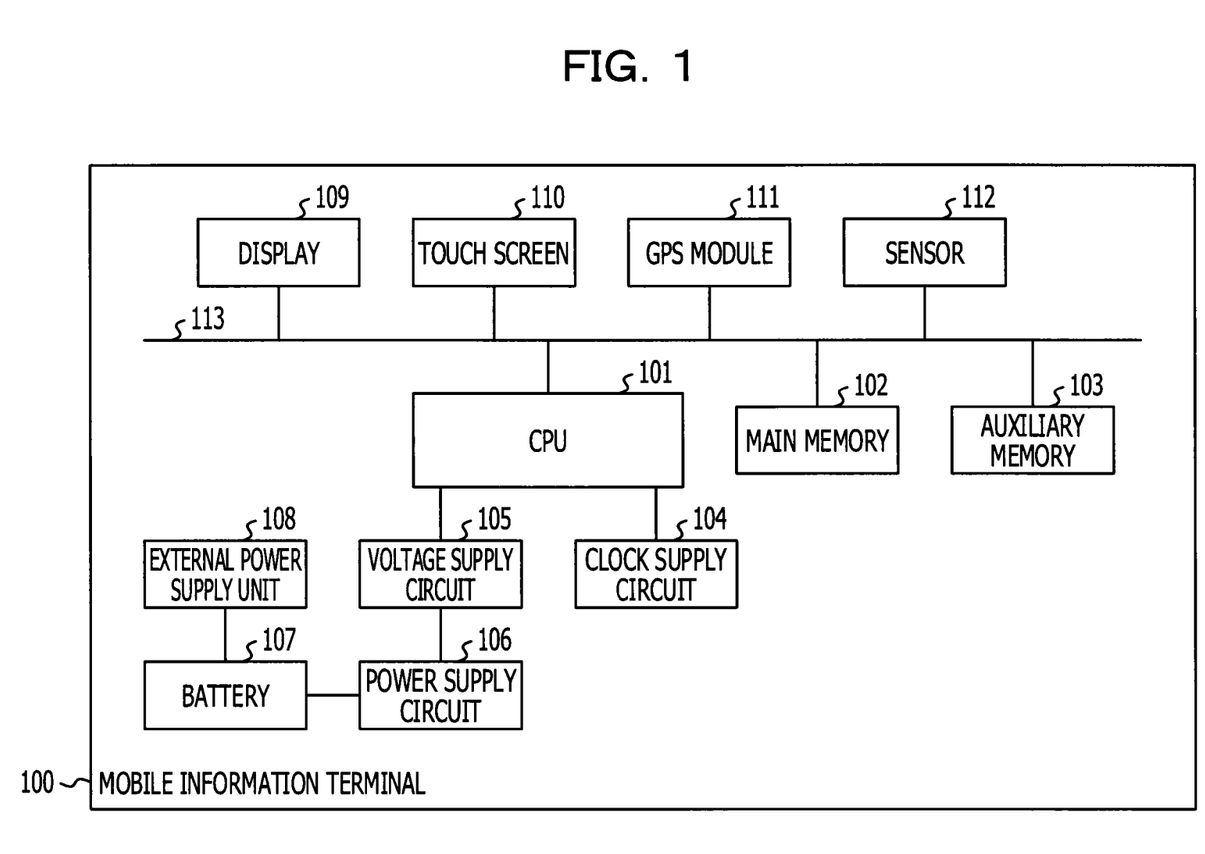
FIG. 1 is a schematic diagram illustrating the hardware configuration of a mobile information terminal according to an embodiment.

FIG. 1 is a schematic diagram illustrating the hardware configuration of a mobile information terminal 100 according to an embodiment.

Examples of the mobile information terminal 100 of the present embodiment include, but are not limited to, mobile information processing apparatuses such as mobile phones (for example, smartphones), notebook computers, tablet computers, and digital cameras.

As illustrated in FIG. 1, the mobile information terminal 100 includes, as hardware modules, a central processing unit (CPU, or a processor) 101, a main memory 102, an auxiliary memory 103, a clock supply circuit 104, a voltage supply circuit 105, a power supply circuit 106, a battery 107, an external power supply unit 108, a display 109, a touch screen 110, a GPS module 111, and a sensor 112. These hardware modules are connected to each other through a bus 113.

The CPU 101 operates in accordance with a clock signal supplied from the clock supply circuit 104 and a voltage supplied from the voltage supply circuit 105, and controls the hardware modules of the mobile information terminal 100. Further, the CPU 101 reads various programs from the auxiliary memory 103 into the main memory 102, and executes the various programs read into the main memory 102 so as to realize various functions. A detailed description of the functions will be given below.

The main memory 102 stores various programs to be executed by the CPU 101. Further, the main memory 102 serves as a work area of the CPU 101, and stores various types of data to be used for processing by the CPU 101. The main memory 102 may be, for example, a random access memory (RAM) or the like.

The auxiliary memory 103 stores various programs for operating the mobile information terminal 100. Examples of programs include application programs to be executed by the mobile information terminal 100, and the operating system (OS) that serves as an environment in which the application programs are executed. A control program according to the present embodiment is also stored in the auxiliary memory 103. The auxiliary memory 103 may be, for example, a non-volatile memory such as a hard disk and a flash memory.

The clock supply circuit 104 generates a clock signal to be supplied to the CPU 101.

The voltage supply circuit 105 uses power supplied from the power supply circuit 106, and generates a variable voltage to be supplied to the CPU 101.

The power supply circuit 106 receives power supplied from the battery 107, and supplies the received power to the hardware modules of the mobile information terminal 100 through a power supply line (not illustrated). If the external power supply unit 108 is connected to an external power source (not illustrated), the power supply circuit 106 may receive power supplied from the external power supply unit 108, and supply the received power to the hardware modules of the mobile information terminal 100.

The battery 107 supplies power to the power supply circuit 106.

The external power supply unit 108 receives power supplied from the external power source, and supplies the received power to the battery 107.

The display 109 is controlled by the CPU 101, and presents image information to the user of the mobile information terminal 100.

The touch screen 110 is attached to the display 109, and inputs location information touched by a pen or a finger of the user of the mobile information terminal 100.

The GPS module 111 is controlled by the CPU 101, and receives GPS satellite signals from a plurality of satellites so as to calculate the location information of the mobile information terminal 100 on the basis of the plurality of GPS satellite signals.

The sensor 112 acquires the status information of the mobile information terminal 100. The sensor 112 may include a baseband interface, a pedometer, a Wi-Fi (registered trademark) interface, Bluetooth (registered trademark), an accelerometer, a camera, an illuminometer, a barometer, and a clock, for example. A pedometer, Bluetooth (registered trademark), an accelerometer, a camera, an illuminometer, a barometer, and a clock which may be included in the sensor 112 detect the number of steps, nearby devices, acceleration, images, illuminance, atmospheric pressure, and time, respectively.

In the present embodiment, a baseband interface may be used as a sensor that detects a cell ID transmitted from a base station for third generation (3G) or the like, or the baseband signal intensity. Further, Wi-Fi may be used as a sensor that detects a MAC address transmitted from an access point.

Figure 2:
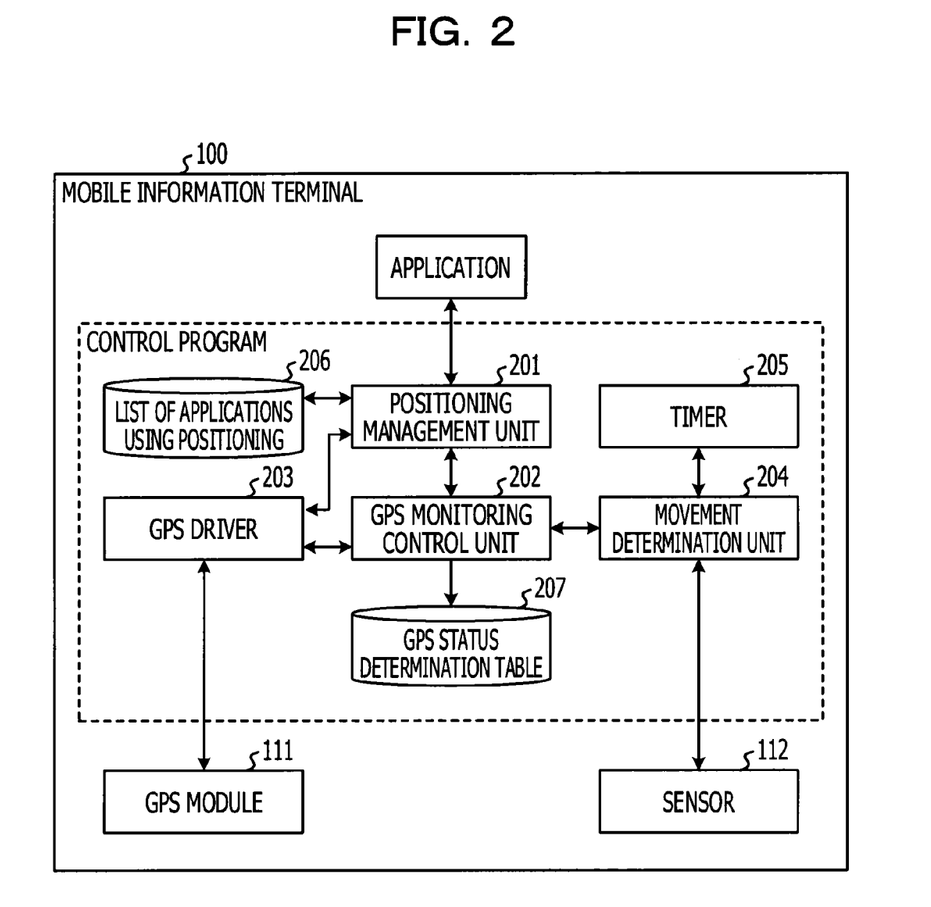
FIG. 2 is a schematic functional block diagram of the mobile information terminal according to the embodiment.

FIG. 2 is a schematic functional block diagram of the mobile information terminal 100 according to the present embodiment.

As illustrated in FIG. 2, the mobile information terminal 100 includes a positioning management unit 201, a GPS monitoring control unit 202, a GPS driver 203, a movement determination unit 204, a timer 205, a list 206 of applications using positioning, and a GPS status determination table 207.

Each of the positioning management unit 201, the GPS monitoring control unit 202, the GPS driver 203, the movement determination unit 204, the timer 205, the list 206 of applications using positioning, and the GPS status determination table 207 is realized when the CPU 101 reads the control program into the main memory 102 and executes the control program read into the main memory 102. Processing for the positioning management unit 201 may be distributed between processing circuitry (including CPU 101) in the mobile information terminal and in a second component that is not physically connected to the mobile information terminal, but in communications with it via wireless signaling. This second component may be a cloud-based processor, or processing resource, that performs all or a discrete part of the position management unit's functions, and communicates with the mobile information terminal 100 wirelessly.

An application (or "App") depicted in FIG. 2 is an application (location-based application) that uses location information. The application App issues a positioning request to the positioning management unit 201, and obtains the positioning results (location information, and error information) from the positioning management unit 201.

The application App is realized when the CPU 101 reads an application program into the main memory 102 and executes the application program read into the main memory 102.

The positioning management unit 201 instructs the GPS driver 203 to activate or deactivate (hereinafter referred to as "turn on or off") the GPS module 111 in response to the positioning request from the application App, and transmits the positioning results obtained from the GPS driver 203, such as location information (latitude and longitude) and positioning errors, to the application App.

Further, the positioning management unit 201 instructs the GPS monitoring control unit 202 to start or stop GPS status monitoring, on the basis of information on applications using positioning which is stored in the list 206.

The GPS monitoring control unit 202 instructs the GPS driver 203 to turn on or off the GPS module 111 on the basis of the reception status of GPS satellite signals. For example, the GPS monitoring control unit 202 maintains the GPS module 111 in the ON state if the reception of GPS satellite signals is good, and turns off the GPS module 111 if the reception of GPS satellite signals is not good.

After instructing the GPS driver 203 to turn off the GPS module 111, if the GPS monitoring control unit 202 determines that the reception state of GPS satellite signals is changed (or may be changed), on the basis of a movement notice from the movement determination unit 204, the GPS monitoring control unit 202 instructs the GPS driver 203 to turn on the GPS module 111.

Further, the GPS monitoring control unit 202 specifies any of parameters stored in the GPS status determination table 207 as a movement determination parameter for the movement determination unit 204, on the basis of the reception status of GPS satellite signals.

The GPS driver 203 turns on or off the GPS module 111 in accordance with an ON or OFF instruction from the positioning management unit 201. Further, the GPS driver 203 transmits the positioning results obtained by the GPS module 111 to the positioning management unit 201.

The movement determination unit 204 performs a movement determination so as to determine whether the mobile information terminal 100 is moved, in accordance with a start instruction from the GPS monitoring control unit 202. More specifically, the movement determination unit 204 performs a movement determination of the mobile information terminal 100, on the basis of sensing information from the sensor 112. The movement determination unit 204 uses the movement determination parameter specified by the GPS monitoring control unit 202. The sensing information may include the number of steps of the user of the mobile information terminal 100, the cell ID of a base station for 3G or the like, the baseband signal intensity, the MAC address of a Wi-Fi access point, and time, for example. As a result of the movement determination, if the mobile information terminal 100 is determined to be moved, the movement determination unit 204 issues a movement notice to the GPS monitoring control unit 202.

The movement determination may be performed using the information such as a change in the number of steps of the user of the mobile information terminal 100, a change to the ID of another base station for 3G or the like, the variance of the intensity of baseband signals for 3G or the like per unit time, a change to the MAC address of another Wi-Fi access point, and the time elapsed after the GPS module 111 is turned off.

The timer 205 counts the time elapsed after the GPS module 111 is turned off, on the basis of time information from the clock serving as the sensor 112.

The list 206 of applications using positioning stores the application name or the application ID of an application under the positioning management by the positioning management unit 201. An application under the positioning management is an application that is managed by the positioning management unit 201 as an application to which the positioning results are to be transmitted.

The GPS status determination table 207 stores movement determination parameters for each state of reception of GPS satellite signals.

Figure 3:
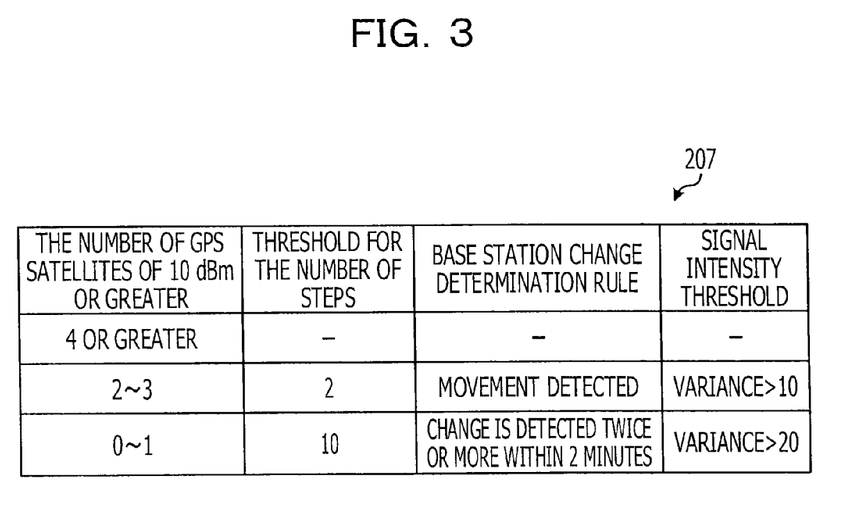
FIG. 3 schematically illustrates a GPS status determination table according to the embodiment.

FIG. 3 schematically illustrates the GPS status determination table 207 according to the present embodiment.

As illustrated in FIG. 3, "the number of GPS satellites of 10 dBm or greater" indicating the reception status of GPS satellite signals is associated with a "threshold for the number of steps", a "base station change determination rule", and a "signal intensity threshold" which serve as the movement determination parameters.

In the case of performing a movement determination using the number of steps obtained by the pedometer, the "threshold for the number of steps" is specified as the movement determination parameter. For example, in FIG. 3, if "the number of GPS satellites of 10 dBm or greater" is "0-1", when ten or more steps are detected, the mobile information terminal 100 is determined to be moved. If "the number of GPS satellites of 10 dBm or greater" is "2-3", when two or more steps are detected, the mobile information terminal 100 is determined to be moved.

In the case of performing a movement determination using the information related to base stations, the "base station change determination rule" is specified as the movement determination parameter. For example, in FIG. 3, if "the number of GPS satellites of 10 dBm or greater" is "0-1", when a base station cell ID change is detected twice or more within two minutes, the mobile information terminal 100 is determined to be moved. If "the number of GPS satellites of 10 dBm or greater" is "2-3", when a base station cell ID change is detected even once, the mobile information terminal 100 is determined to be moved.

In the case of performing a movement determination using the variance of the baseband signal intensity per unit time, the "signal intensity threshold" is specified as the movement determination parameter. For example, in FIG. 3, if "the number of GPS satellites of 10 dBm or greater" is "0-1", when the variance of the baseband signal intensity per unit time is greater than 20, the mobile information terminal 100 is determined to be moved. If "the number of GPS satellites of 10 dBm or greater" is "2-3", when the variance of the baseband signal intensity per unit time is greater than 10, the mobile information terminal 100 is determined to be moved.

Figure 4:
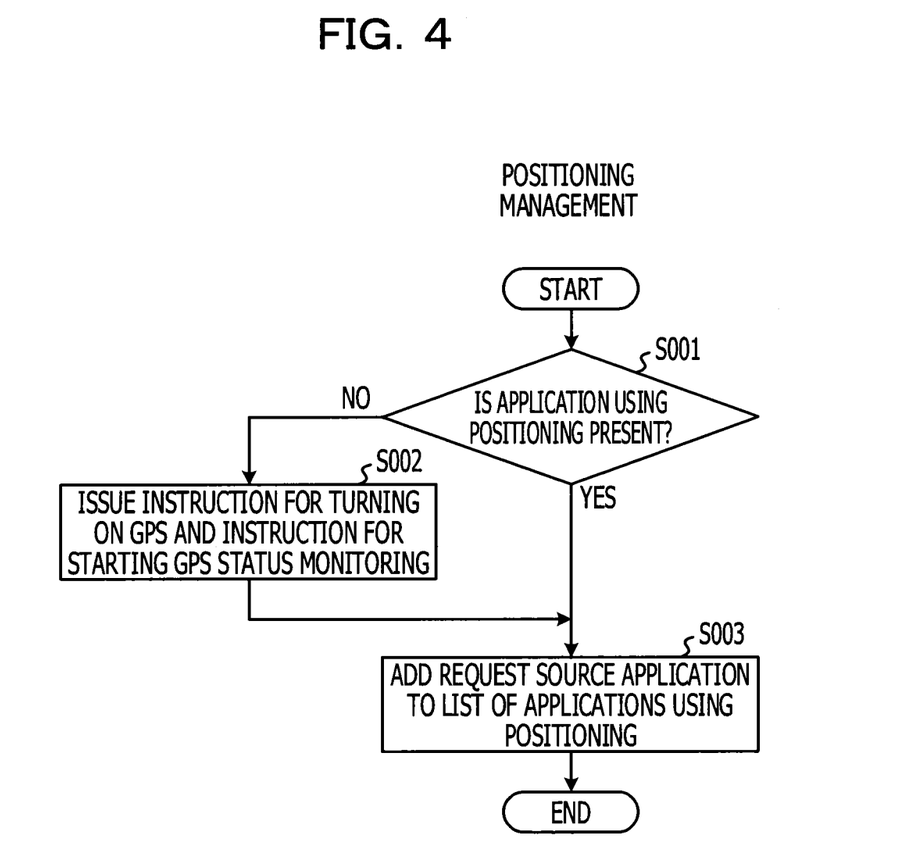
FIG. 4 is a flowchart of positioning management according to the embodiment.

FIG. 4 is a flowchart of positioning management according to the present embodiment.

As illustrated in FIG. 4, upon receiving a positioning request from an application, the positioning management unit 201 refers to the list 206 of applications using positioning, and determines whether an application using positioning is present, in other words, whether an application under the positioning management by the positioning management unit 201 is present (step S001).

If the positioning management unit 201 determines that an application using positioning is not present (No in step S001), that is, if an application under the positioning management by the positioning management unit 201 is not present, the positioning management unit 201 instructs the GPS driver 203 to turn on the GPS module 111, and also instructs the GPS monitoring control unit 202 to start GPS status monitoring (step S002). The GPS driver 203 turns on the GPS module 111 in accordance with the instruction from the positioning management unit 201. Further, the GPS monitoring control unit 202 starts "GPS status monitoring", which will be described below, in accordance with the instruction from the positioning management unit 201 for starting GPS status monitoring.

Then, the positioning management unit 201 adds the request source application, which has issued the positioning request, to the list 206 of applications using positioning (step S003).

On the other hand, if the positioning management unit 201 determines that an application using positioning is present (Yes in step S001), that is, if an application under the positioning management by the positioning management unit 201 is present, the positioning management unit 201 adds the request source application, which has issued the positioning request, to the list 206 of applications using positioning (step S003). Thus, the GPS management ends.

Figure 5:
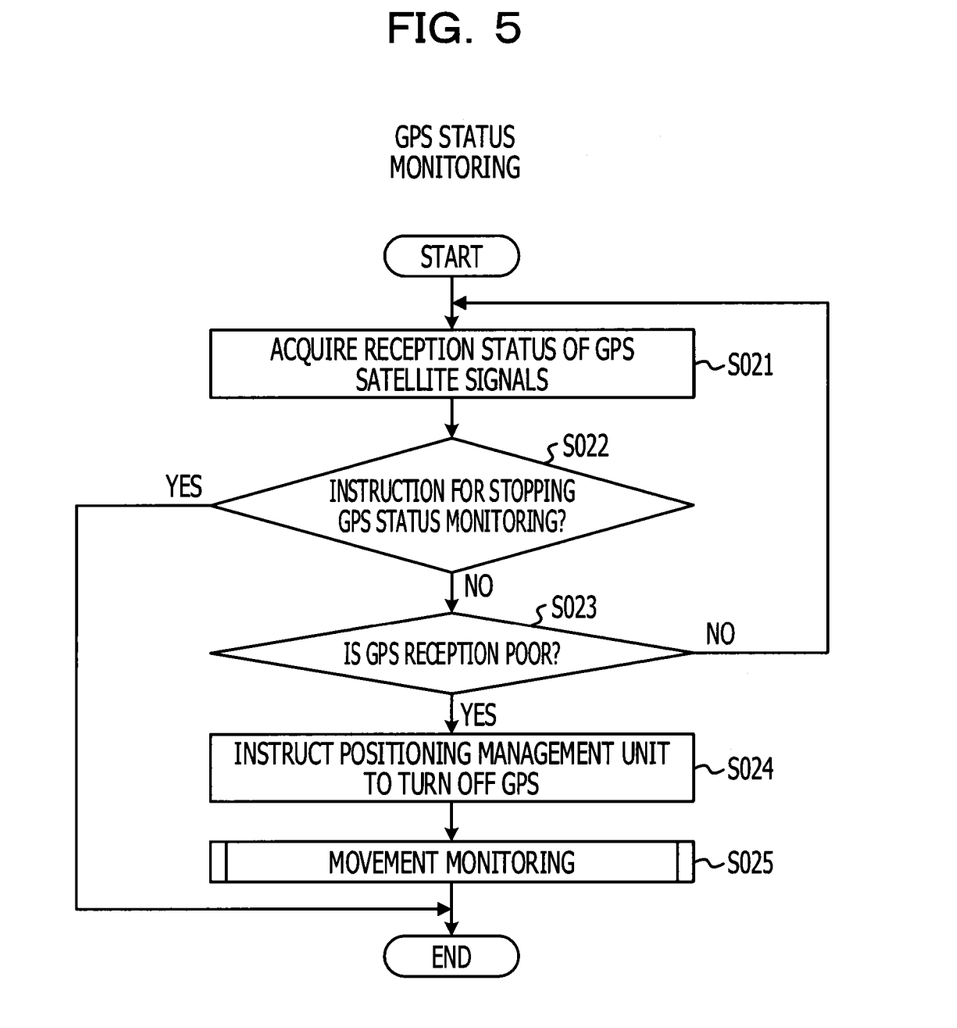
FIG. 5 is a flowchart of GPS status monitoring according to the embodiment.

FIG. 5 is a flowchart of GPS status monitoring according to the present embodiment.

As illustrated in FIG. 5, the GPS monitoring control unit 202 acquires the reception status of GPS satellite signals, during reception of GPS satellite signals (step S021). The GPS monitoring control unit 202 stores the latest reception status of GPS satellite signals.

Then, the GPS monitoring control unit 202 determines whether an instruction for stopping GPS status monitoring is received (step S022).

If the GPS monitoring control unit 202 determines that an instruction for stopping GPS status monitoring is received (Yes in step S022), the GPS monitoring control unit 202 terminates the GPS status monitoring.

On the other hand, if the GPS monitoring control unit 202 determines that an instruction for stopping GPS status monitoring is not received (No in step S022), the GPS monitoring control unit 202 determines whether the reception of GPS satellite signals is poor (step S023).

If the GPS monitoring control unit 202 determines that the reception of GPS satellite signals is not poor (No in step S023), the GPS monitoring control unit 202 acquires the reception status of GPS satellite signals again (step S021).

On the other hand, if the GPS monitoring control unit 202 determines that the reception of GPS satellite signals is poor (Yes in step S023), the GPS monitoring control unit 202 instructs the positioning management unit 201 to turn off the GPS module 111 (step S024). Then, the positioning management unit 201 controls the GPS driver 203 so as to turn off the GPS module 111. Note that when the GPS module 111 is off, even if a positioning request is issued from the application App, for example, the GPS module 111 does not calculate location information. That is, in the present embodiment, if the reception of GPS satellite signals is poor, the GPS module 111 is turned off, so that GPS positioning is not performed. Thus, power consumption is reduced.

Then, the GPS monitoring control unit 202 performs "movement monitoring", which will be described below (step S025).

Figure 6:
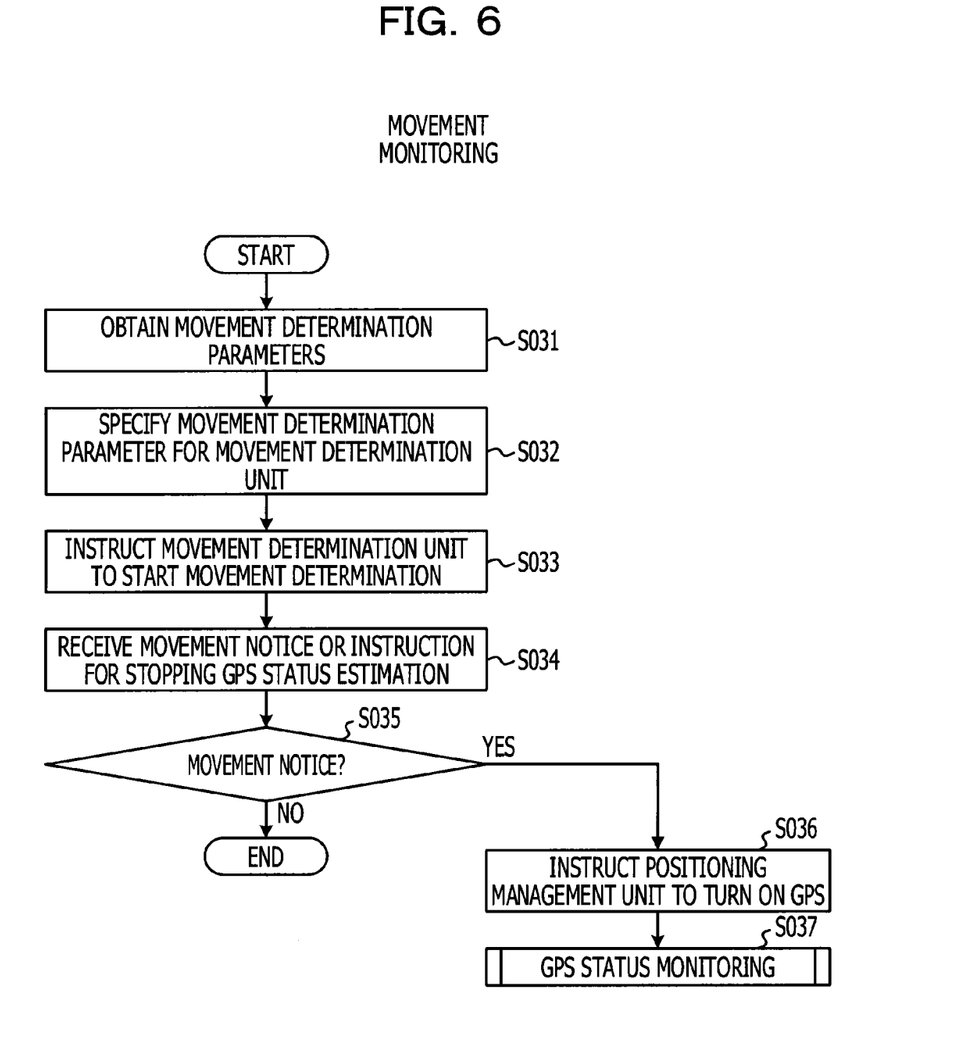
FIG. 6 is a flowchart of movement monitoring according to the embodiment.

FIG. 6 is a flowchart of movement monitoring according to the present embodiment.

As illustrated in FIG. 6, the GPS monitoring control unit 202 refers to the GPS status determination table 207, and obtains the movement determination parameters associated with the latest reception status of GPS satellite signals which is stored in advance (step S031). More specifically, the GPS monitoring control unit 202 obtains the movement determination parameters (a threshold for the number of steps, a base station change determination rule, and a signal intensity threshold) corresponding to "the number of GPS satellites of 10 dBm or greater" indicating the latest reception status of GPS satellite signals. For example, if "the number of GPS satellites of 10 dBm or greater" is "2", "2" is obtained as the threshold for the number of steps; "movement detected" is obtained as the base station change determination rule; and "variance>10" is obtained as the signal intensity threshold.

Then, the GPS monitoring control unit 202 specifies for the movement determination unit 204 any of the movement determination parameters obtained from the GPS status determination table 207 (step S032).

Then, the GPS monitoring control unit 202 instructs the movement determination unit 204 to start a movement determination (step S033). In response to an instruction for starting a movement determination as a trigger, the movement determination unit 204 starts a movement determination of the mobile information terminal 100, using the movement determination parameter specified by the GPS monitoring control unit 202.

Then, the GPS monitoring control unit 202 receives a movement notice from the movement determination unit 204 or an instruction for stopping GPS status estimation from the positioning management unit 201 (step S034).

Then, the GPS monitoring control unit 202 determines whether a movement notice is received from the movement determination unit 204 (step S035).

If the GPS monitoring control unit 202 determines that a movement notice is not received (No in step S035), that is, if an instruction for stopping GPS status estimation is received, the GPS monitoring control unit 202 terminates the GPS status monitoring.

On the other hand, if the GPS monitoring control unit 202 determines that a movement notice is received (Yes in step S035), the GPS monitoring control unit 202 instructs the positioning management unit 201 to turn on the GPS module 111 (step S036). Then, the positioning management unit 201 controls the GPS driver 203 so as to turn on the GPS module 111. Note that when the GPS module 111 is on, if a positioning request is issued from the application App, for example, the GPS module 111 calculates location information. That is, in the present embodiment, if a movement notice is received, that is, if the mobile information terminal 100 is determined to be moved, the GPS module 111 is turned on, so that GPS positioning is restarted.

Then, the GPS monitoring control unit 202 performs the "GPS status monitoring" described above (step S037).

The following is a specific example. In the case where the mobile information terminal 100 is inside a building and has acquired two GPS satellites although it is difficult to perform positioning using GPS satellite signals (that is, in the case where the mobile information terminal 100 is near the window), if just a movement of, for example, two steps (movement determination parameter) is detected, the GPS module 111 is turned on so as to perform GPS monitoring. This is because it is assumed that, in the case where two GPS satellites have been acquired, a movement of only a small number of steps, for example, two steps, is desired to allow the mobile information terminal 100 to acquire three GPS satellites.

On the other hand, in the case where the mobile information terminal 100 is inside a building and has not acquired any GPS satellite so that it is difficult to perform positioning using GPS satellite signals (that is, in the case where the mobile information terminal 100 is away from the window), the GPS module 111 is not turned on unless a movement of, for example, thirty steps (movement determination parameter) is detected. This is because it is assumed that, in the case where no GPS satellite has been acquired, a movement of a large number of steps, for example, thirty steps, is desired to allow the mobile information terminal 100 to acquire three GPS satellites.

These assumptions are based on the findings that the distribution of the reception status of GPS satellite signals has continuity except in special cases. More specifically, it is known that when the reception of GPS satellite signals becomes poor, the number of acquired GPS satellites does not sharply reduce from 3 to 1, for example, but gradually decreases from 3 to 2, then to 1, and then to 0. Similarly, when the reception of GPS satellite signals is improved, the number of acquired GPS satellites does not sharply increase from 0 to 3, for example, but gradually increases from 0 to 1, then to 2, and then to 3.

According to the present embodiment described above, a movement determination parameter to be used for movement determination of the mobile information terminal 100 is determined on the basis of the reception status of GPS satellite signals. Therefore, it is possible to control the timing of turning on the GPS module 111 on the basis of a movement determination suitable for the reception status of GPS satellite signals. Accordingly, for example, when the reception of GPS satellite signals is poor, the GPS module 111 is not activated (not restarted). Thus, wasteful power consumption may be reduced.

In the present embodiment, the reception status of GPS satellite signals is used for movement determination of the mobile information terminal 100. However, the present embodiment is not limited thereto. For example, in the case where the location information of the mobile information terminal 100 is acquired on the basis of the MAC address of Wi-Fi or the cell ID of the base station of the baseband, the location information of the mobile information terminal 100 may be used for movement determination of the mobile information terminal 100. In other words, the distance to a location where location information may be acquired using GPS satellite signals, that is, a movement determination parameter of the present embodiment, may be determined on the basis of the location information of the mobile information terminal 100.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A method executed by a processor included in a mobile information terminal, the mobile information terminal including a module device that identifies a position of the mobile information terminal based on a received signal received from each of a plurality of satellites, the method comprising:
    deactivating the module device when a number of satellites of which signal strength is equal to or greater than a predetermined strength, the number indicating a reception status of the received signal, is less than a threshold;
    selecting an index from a plurality of indices, each index related to a movement of the mobile information terminal after deactivating the module device;
    extracting from a memory a determination parameter, from a plurality of determination parameters defined for each of the indices, the extracted determination parameter corresponding to the number indicating the reception status of the received signal; and
    activating the module device when a value of the selected index is determined to satisfy the extracted determination parameter.

2. The method according to claim 1, further comprising:
    setting, as the selected index, an amount of the movement of the mobile information terminal after deactivating the module device, said setting being performed prior to said activating.

3. The method according to claim 1, further comprising:
    setting, as the selected index, time elapsed after deactivating the module device, said setting being performed prior to said activating.

4. The method according to claim 2, wherein
    the activating is triggered for a first amount of the movement when the number of satellites is greater than a predetermined number, and the activating is triggered for a second amount of the movement when the number of satellites is less than the predetermined number, and
    the first amount of the movement is less than the second amount of the movement.

5. The method according to claim 2, further comprising:
    setting, as the selected index, a number of changes in base station ID per unit time.

6. The method according to claim 5, wherein
    the activating is triggered for a first amount of the movement when the number of changes in base station ID per unit time is less than a predetermined amount, and the activating is triggered for a second amount of the movement when the number of changes in base station ID per unit time is greater than the predetermined amount, and
    the first amount of the movement is less than the second amount of the movement.

7. The method according to claim 2, further comprising:
    setting, as the selected index, a variance of baseband signal intensity per unit time.

8. The method according to claim 7, wherein
    the activating is triggered for a first amount of the movement when the variance of baseband signal intensity per unit time is less than a predetermined amount, and the activating is triggered for a second amount of the movement when the variance of baseband signal intensity per unit time is greater than the predetermined amount, and
    the first amount of the movement is less than the second amount of the movement.

9. A mobile information terminal comprising:
    a module device configured to identify a position of the mobile information terminal based on a received signal received from each of a plurality of satellites; and
    a processor configured to:
        deactivate the module device when a number of satellites of which signal strength is equal to or greater than a predetermined strength, the number indicating a reception status of the received signal, is less than a threshold,
        select an index from a plurality of indices, each index related to a movement of the mobile information terminal after deactivating the module device,
        extract from a memory a determination parameter, from a plurality of determination parameters defined for each of the indices, the extracted determination parameter corresponding to the number indicating the reception status of the received signal, and
        activate the module device when a value of the selected index is determined to satisfy the extracted determination parameter.

10. The terminal according to claim 9, wherein:
    the processor is further configured to set, as the selected index, an amount of the movement of the mobile information terminal after deactivating the module device.

11. The terminal according to claim 9, wherein:
    the processor is further configured to set, as the selected index, time elapsed after deactivating the module device.

12. The terminal according to claim 10, wherein:
    the processor is configured to activate the module device in response to a first amount of the movement when the number of satellites is greater than a predetermined number, and the activate the module device in response to a second amount of the movement when the number of satellites is less than the predetermined number, and
    the first amount of the movement is less than the second amount of the movement.

13. The terminal according to claim 10, wherein:
    the processor is further configured to set, as the selected index, a number of changes in base station ID per unit time.

14. The terminal according to claim 10, wherein:
    the processor is further configured to set, as the selected index, a variance of baseband signal intensity per unit time.

15. A non-transitory computer readable storage medium that stores a control program for causing a mobile information terminal that includes a module device that identifies a position of the mobile information terminal based on a received signal received from each of a plurality of satellites to execute a process, the process comprising:
    deactivating the module device when a number of satellites of which signal strength is equal to or greater than a predetermined strength, the number indicating a reception status of the received signal, is less than a threshold;
    selecting an index from a plurality of indices, each index related to a movement of the mobile information terminal after deactivating the module device;
    extracting from a memory a determination parameter, from a plurality of determination parameters defined for each of the indices, the extracted determination parameter corresponding to the number indicating the reception status of the received signal; and activating the module device when a value of the selected index is determined to satisfy the extracted determination parameter.

* * * * *